(12) United States Patent
Okhotski

(10) Patent No.: US 8,005,929 B1
(45) Date of Patent: Aug. 23, 2011

(54) SOFTWARE UPDATE CHECKING METHOD

(75) Inventor: Dmitri Okhotski, Santa Ana, CA (US)

(73) Assignee: Symantec Operating Corporation, Mountain View, CA (US)

(*) Notice: Subject to any disclaimer, the term of this patent is extended or adjusted under 35 U.S.C. 154(b) by 229 days.

(21) Appl. No.: 12/395,039

(22) Filed: Feb. 27, 2009

(51) Int. Cl.
*G06F 15/177* (2006.01)
*G06F 15/173* (2006.01)

(52) U.S. Cl. .................................. 709/220; 709/223

(58) Field of Classification Search .......... 709/201–203, 709/217–232
See application file for complete search history.

(56) References Cited

U.S. PATENT DOCUMENTS

| | | | |
|---|---|---|---|
| 5,155,847 A | 10/1992 | Kirouac et al. | |
| 5,421,009 A | 5/1995 | Platt | |
| 5,473,772 A | 12/1995 | Halliwell et al. | |
| 5,493,682 A | 2/1996 | Tyra et al. | |
| 5,555,416 A | 9/1996 | Owens et al. | |
| 5,790,796 A | 8/1998 | Sadowsky | |
| 6,123,737 A | 9/2000 | Sadowsky | |
| 6,128,601 A * | 10/2000 | Van Horne et al. | 705/36 R |
| 6,182,146 B1 * | 1/2001 | Graham-Cumming, Jr. | 709/238 |
| 6,212,557 B1 * | 4/2001 | Oran | 709/221 |
| 7,062,765 B1 * | 6/2006 | Pitzel et al. | 717/177 |
| 7,069,317 B1 | 6/2006 | Colrain et al. | |
| 2001/0037464 A1 * | 11/2001 | Persels et al. | 713/201 |
| 2002/0166001 A1 * | 11/2002 | Cheng et al. | 710/1 |
| 2005/0102662 A1 * | 5/2005 | Samsalovic et al. | 717/168 |
| 2006/0130046 A1 * | 6/2006 | O'Neill | 717/168 |
| 2008/0183878 A1 * | 7/2008 | Panda et al. | 709/228 |

OTHER PUBLICATIONS

Microsoft Corporation, "How to configure and use Automatic Updates in Windows XP", Microsoft, Inc., downloaded from http://support.microsoft.com/kb/306525, Dec. 5, 2007, 4 pages.

* cited by examiner

*Primary Examiner* — Yasin Barqadle
(74) *Attorney, Agent, or Firm* — Rory D. Rankin; Meyertons, Hood, Kivlin, Kowert & Goetzel, P.C.

(57) ABSTRACT

A computer system and method for updating a software product. A computer system includes at least one client coupled to a server. The server obtains updates of a software product and associates the updates with ports. The server receives a query from a client including a request for a software product update via a first port. In response to receiving the update query, the server opens a connection to the client via the first port and determines if an update is associated with the first port. If an update is associated with the first port, the server conveys a response to the client including an update that is associated with the first port. If an update is not associated with the first port, the server closes the connection. Ports are sequentially numbered. The server maps updates to ports based on timestamps associated with the updates.

17 Claims, 11 Drawing Sheets

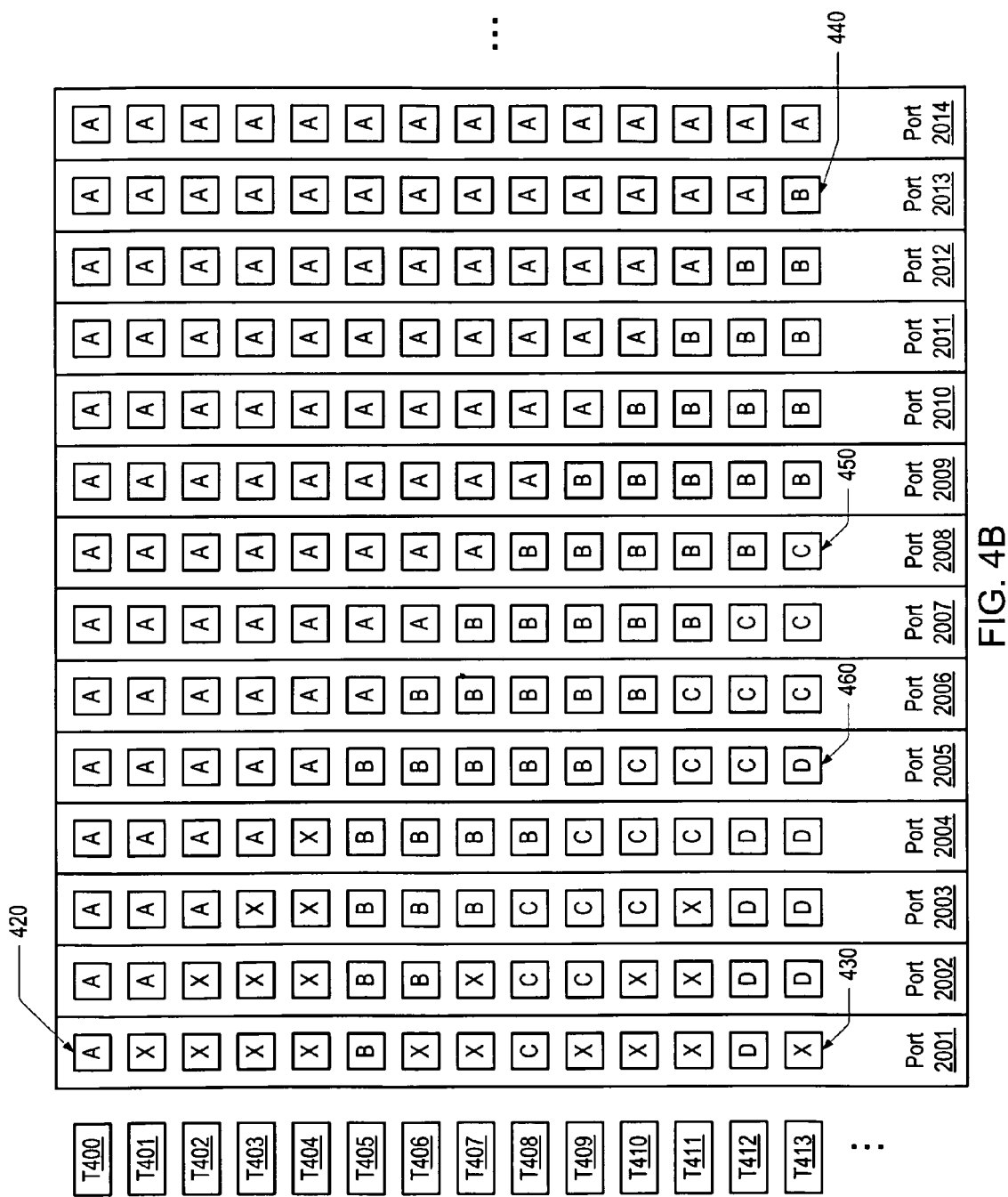

SOFTWARE UPDATE CHECKING METHOD

BACKGROUND OF THE INVENTION

1. Field of the Invention

This invention relates to computer systems and, more particularly, to updating software components on computer systems.

2. Description of the Related Art

It is common practice for individuals and enterprises to enhance and improve the capabilities of computer systems by updating software components from time to time. For example, updates may be necessary to ensure that a software product complies with the latest security and functional specifications. Although software updates that add new features may occur infrequently, it is increasingly common to require frequent updates that include security patches, virus protection data, and other time-critical enhancements. Consequently, the load placed on servers that serve updates to a large number of clients has increased.

At present, clients may check for software updates by establishing a communication link to a Web, FTP, network, or other type of server using an application level protocol over TCP/IP, such as HTTP or FTP. However, the use of network server software consumes significant server resources, leading to a limit on the number of clients that may be served. For instance, resources may be consumed by connections that service software requests even when no updates are available. The network server may consume resources during processing of each request by checking for the presence of an update and generating a corresponding response. The combination of issues described above may lead to wasting of time and server resources during software updating, especially in enterprises that support large numbers of computer systems.

In view of the above, an effective system and method for obtaining software updates that accounts for these issues are desired.

SUMMARY OF THE INVENTION

Various embodiments of a computer system and methods are disclosed. In one embodiment, a computer system includes at least one client coupled to a server. The server obtains updates of a software product and associates the updates with a plurality of ports. The server receives a query from a client including a request for a software product update via a first port. In response to receiving the update query, the server opens a connection to the client via the first port and determines whether or not an update is associated with the first port. In response to determining that an update is associated with the first port, the server conveys a response to the client including an update that is associated with the first port. In response to determining that an update is not associated with the first port, the server closes the connection. In one embodiment, the update query is processed below an application layer of the server's communication protocol stack and in response to determining that an update is not associated with the first port, processing of the update query is competed below the application layer.

In a further embodiment, the client receives a reply including a latest software product update from the server via the first port if a more recent update than the most recently received update is available. The client determines that no more recent update than the most recently received update is available in response to detecting that a connection to the server via the first port has been opened and closed without a reply.

In a still further embodiment, the server maps each update to one or more ports. A given update is mapped to one or more ports selected based, at least in part, on a timestamp associated with the given update. In a still further embodiment, ports are sequentially numbered. The server determines a base port number and in response to detecting that a new update is available, associates the new update with either a port whose number is the base port number or a port whose number is next before a number of a port that is associated with a timestamp of an older update. The server shifts the association of each update to a next port number at regular intervals. In a still further embodiment, the server removes any update associations from the port whose number is the base port number in response to determining that a new update is not available and associates the new update with all ports whose numbers are in a range starting at the base port number and extending to a number next before a number of a port that is associated with an older update in response to detecting that a new update is available. In a still further embodiment, the client calculates a port number of the first port on which to communicate with the server based, at least in part, on a time difference between a current time and a timestamp associated with an update on the client.

These and other embodiments will become apparent upon consideration of the following description and accompanying drawings.

BRIEF DESCRIPTION OF THE DRAWINGS

FIG. 4B illustrates an alternative embodiment of a mapping between port numbers and updates that uses a time-based mapping algorithm.

Figure 1:
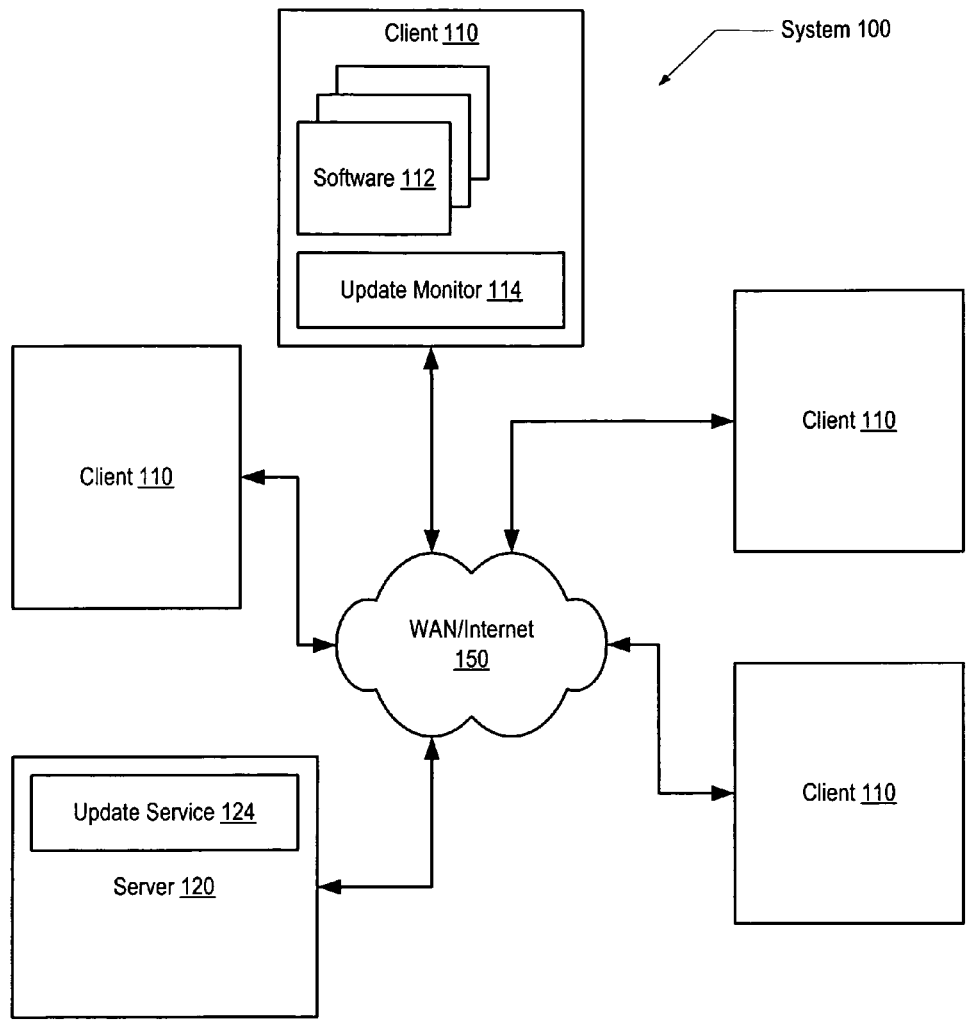
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes one or more clients 110 and at least one server 120 interconnected via a network 150 such as a WAN or the Internet. Clients 110 are representative of any number of stationary computers such as desktop PCs or workstations or mobile computers such as laptops, handheld computers, etc.

In alternative embodiments, the number and type of workstations, laptop computers, and networks is not limited to those shown in FIG. 1. Almost any number and combination of servers, workstations, and laptop computers may be interconnected in system 100 via various combinations of modem banks, direct LAN connections, wireless connections, WAN links, etc. Also, at various times one or more workstations and/or laptop computers may operate offline. In addition, during operation, individual computer connection types may change as mobile users travel from place to place connecting, disconnecting, and reconnecting to system 100. In still further alternative embodiments, individual workstations and laptop computers may operate as peers in a peer-to-peer configuration while performing the functions of clients and servers as described further below.

Any of clients 110 may include one or more software programs 112 and an update monitor 114. During operation of system 100, software updates to any of software 112 may be desired. In one embodiment, a client 110 may obtain updates to software 112 from an update service 124 included in server 120. Client 110 and server 120 may each include a communications stack through which to establish a connection. Once a connection is established, software updates may be conveyed from server 120 to client 110.

Figure 2:
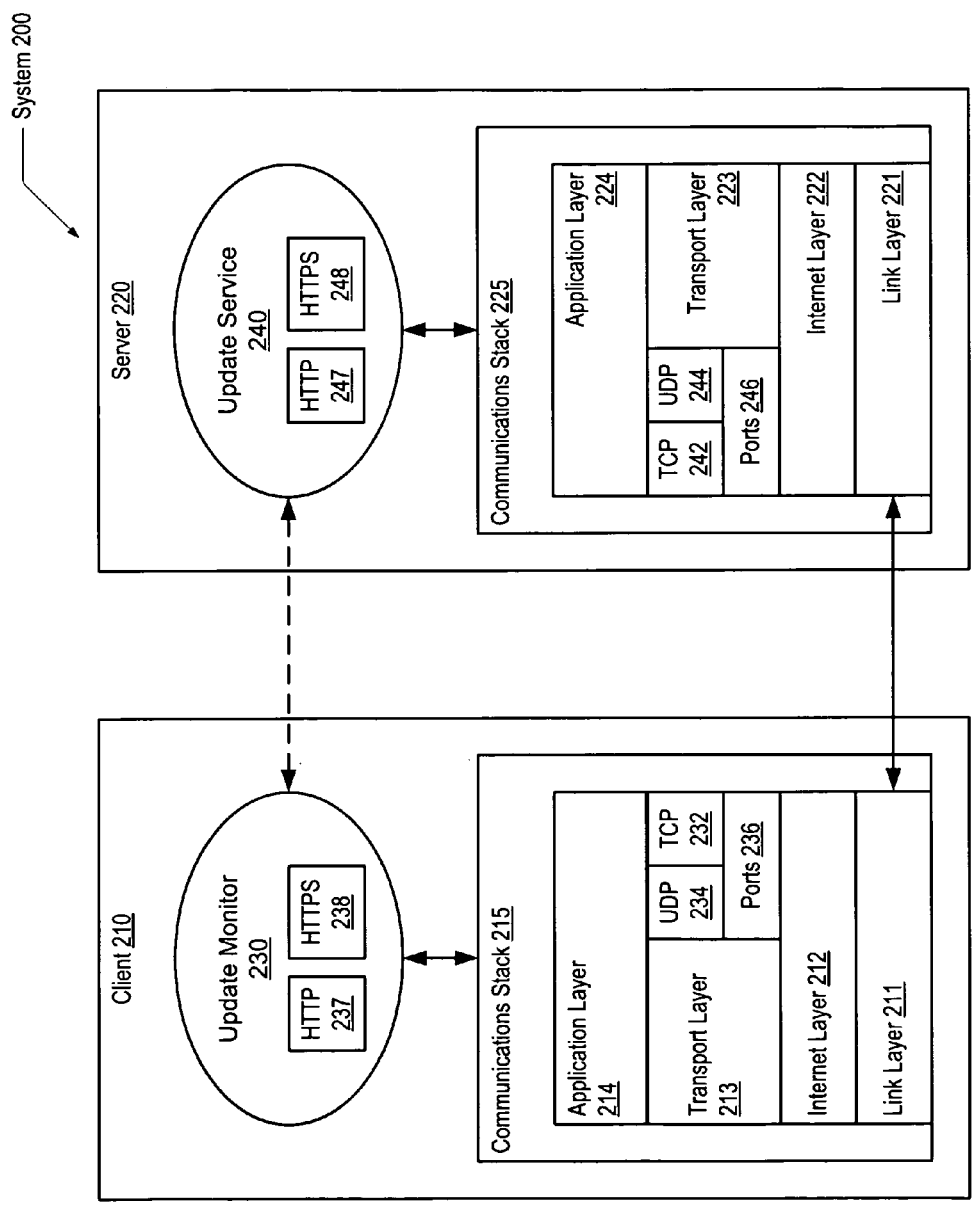
FIG. 2 is a more detailed block diagram of one embodiment of a computer system.

FIG. 2 is a more detailed block diagram of one embodiment of a computer system 200. Computer system 200 comprises a client 210 coupled to a server 220. Client 210 includes a multi-layered communications stack 215 and an update monitor 230. Server 220 includes a multi-layered communications stack 225 and an update service 240. In one embodiment, the client's communications stack 215 includes a link layer 211, an Internet layer 212, a transport layer 213, and an application layer 214 that generally correspond to a TCP/IP model or Internet Reference Model software protocol stack. Similarly, communications stack 225 may include a link layer 221, an Internet layer 222, a transport layer 223, and an application layer 224. Alternative client and server embodiments may include various other layers corresponding to other models such as the ISO 7498 or the OSI reference model, etc. The single client 210 that is shown in the illustration is meant to be representative of any number of similar clients that connect to server 220 in a similar manner.

Link layers 211 and 221 provide network connectivity between hosts (clients and servers) as well as the ability to move packets from host to host (e.g. between routers and between gateways). Each link layer may encompass media access control protocols such as Ethernet, ISDN, FDDI, etc. as well as any hardware-dependent functionality.

Internet layers 212 and 222 may be responsible for conveying data packets from a source to a destination and may include various routable protocols. As illustrated, Internet layers 212 and 222 may transmit and receive packets on behalf of any of a variety of transport layer protocols.

Transport layers 213 and 223 may include various transport layer protocols to deliver data packets to one or more processes executing at application layer 214 or 224. In particular, each transport layer may implement the Transmission Control Protocol (TCP 232 or TCP 242) or the User Datagram Protocol (UDP 234 or UDP 244). These or other transport layer protocols may provide communication through the Internet layer via interfaces referred to as sockets. A socket, as used herein, refers to a combination of a port number and an Internet Protocol (IP) address that are assigned to an application layer process for communication over an IP network. In the illustrated embodiment, transport layer 213 includes a set of numbered ports 236. Transport layer 223 may include a set of numbered ports 246 that could be used for connections with ports 236. Ports, as referred to herein, are communications endpoints provided by the transport layer. In one embodiment, ports are identified by a 16-bit unsigned integer ranging from 0 to 65535. A protocol operating above the transport layer may bind to one or more ports in order to send or receive data. In particular, a protocol operating above the transport layer may listen on a particular port and receive packets for which the destination field of the packet matches the particular port number and/or send a packet through a port if the source field in the packet matches the particular port number.

Application layers 214 and 224 may include a variety of application layer protocols and support higher-level functions. In one embodiment, application layer 214 may support an update monitor 230 that determines when updates are available and acquires those updates on behalf of one or more software programs executing on client 210 from an update service 240 executing on server 220 and supported by application layer 224. In one embodiment, update monitor 230 may communicate with update service 240 through a TCP/IP socket and through one or more ports on each of client 210 and server 220 using an application level protocol, such as HTTP 237, HTTPS 238, etc. In response to receiving a request on a particular port, if the server determines that an update is associated with the particular port, the update may be provided to the requesting client using an application layer protocol, such as HTTP 247, HTTPS 248, etc. In addition, a portion of update service 240 may listen for and intercept communications requests from ports 246 directly above the transport layer 223, below the application layer protocols. The following figures illustrate various ways update monitor 230 and update service 240 may use ports to find and retrieve software updates.

Figure 3:
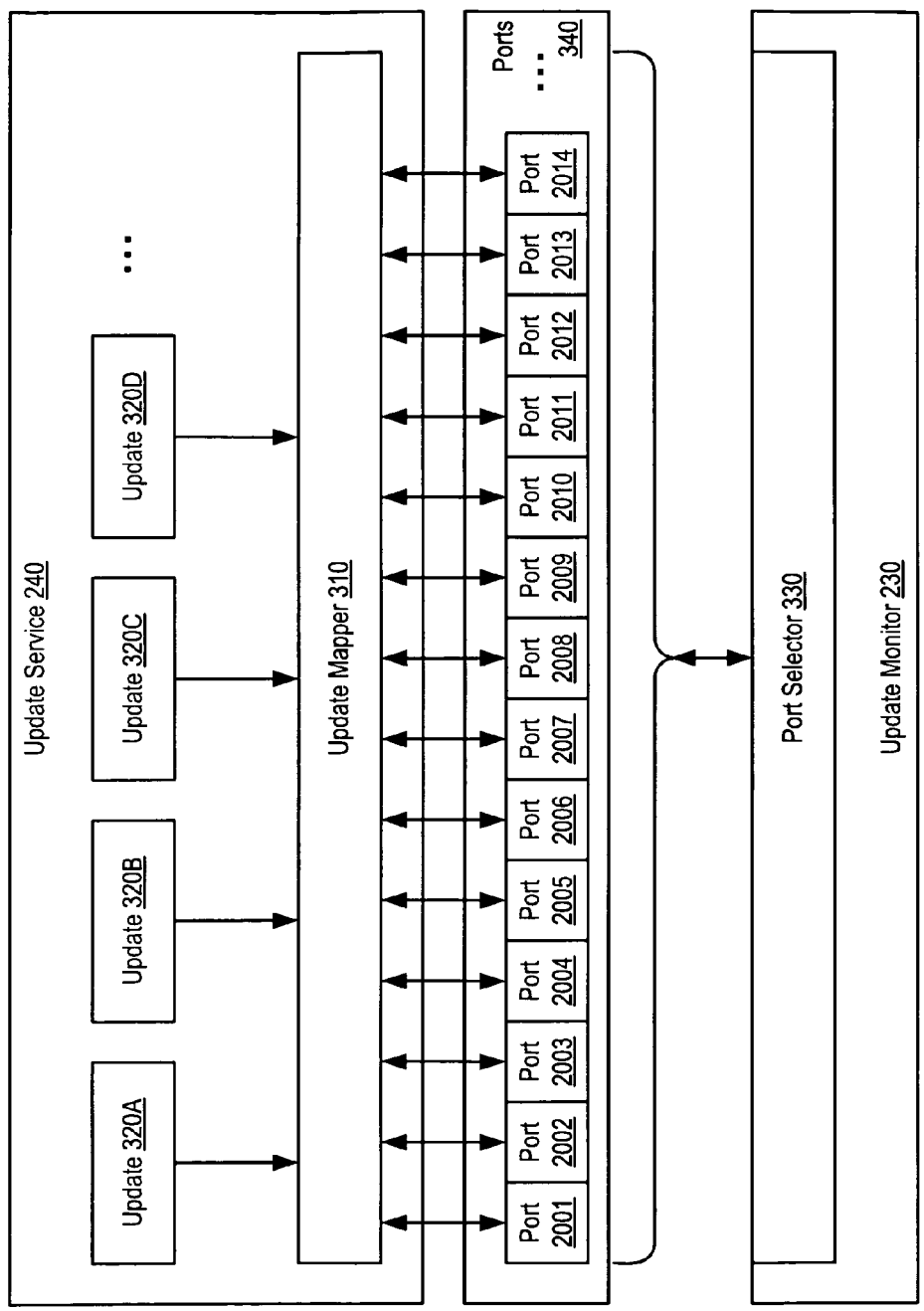
FIG. 3 is a generalized block diagram of one embodiment of port-based communication between an update monitor and an update service.

FIG. 3 is a generalized block diagram of one embodiment of port-based communication between update monitor 230 and update service 240. In the illustrated embodiment, update monitor 230 includes a port selector 330 coupled to a set of ports on the client. Update service 240 includes a sequence of updates 320A-320D, etc. coupled through an update mapper 310, which is coupled to ports 2001-2014 of ports 340 on the update server. In one embodiment of the update server, ports numbered between 1 and 1023 may be reserved for use by various standard protocols and software. These may be referred to as well-know port numbers. For example, port 80 may be reserved for use by standard HTTP server software, ports 20 and 21 for file transfer protocol (FTP) server software, port 23 for Telnet server software, etc. Update service 240 may be configured to limit the port numbers it uses to a range between 1024 and 65535 to avoid overlapping the well-known port numbers. In alternative embodiments, update service 240 may use any range of port numbers that are not reserved for some other purpose. In either case, update service 240 may determine whether or not an update could be provided by operating on ports directly, below the application layer of the server's communication protocol stack. Once a determination has been made that an update could be provided, update service 240 may convey the update to update monitor 230 via an HTTP, HTTPS, or other application layer protocol. However, in response to determining that an update could not be provided, update service 240 may complete processing of the update query below the application layer by gracefully closing the first port connection with update monitor 230 without passing the query up the communications protocol stack. For convenience, in the discussions that follow, the numeral used as an element identifier in the figures to identify a port will also be the port number used by update monitor 230 and update service 240, although this not intended to limit in any way the port numbers available for use by the invention.

During operation, update service 240 may generate or obtain updates 320A-320D, etc. Update mapper 310 may associate each of updates 320A-320D with one or more of ports 2001-2014, using any of a variety of mapping algorithms. Update service 240 may listen for communication queries on all ports that are associated with any available update and respond to a query by conveying an associated update to the querying client through the corresponding port. At the same time, port selector 330 may use a port selection algorithm to select one of update server's ports 2001-2014 on which to query for an update that corresponds to the mapping algorithm used by update mapper 310. If port selector 330 queries update service 240 using a port that is not associated with an update, update service 240 may allow the connection to be made and then gracefully close the connection. The graceful closing of the connection serves as a signal to port selector 330 that no update is available. Port selector 330 may be configured to distinguish between a connection that is opened and gracefully closed and a connection that fails to be established, such as would be the case with a server that is not operating or has lost connectivity. For example, port selector 330 may detect a difference in response time between a failed connection attempt and a connection that is not associated with an update.

Generally speaking, updates may be incremental, differential, or cumulative. Cumulative updates are updates from any older software version to a specific software version. Incremental updates are updates from a specific older software version to a specific newer software version. Differential updates are updates from a specific older software version to a latest software version. Cumulative updates may be applied to a software product irrespective of any previous incremental updates, as long as the incremental updates that have been applied have not brought the software version to a later version than the cumulative update would. However, two cumulative updates may not be applied out of order. For example, if a cumulative update has been applied, and an attempt to apply an earlier cumulative update is made, the attempt may be aborted by software that detects a timestamp on each update, or any other suitable mechanism. Incremental updates may be smaller than cumulative updates and maybe intended to be applied one after another after a certain cumulative update or without any cumulative update. Incremental updates may be intended to be applied in a particular sequence without omission of any incremental update in the sequence. Differential updates may be used to bring a software product from a certain applied update to an up-to-date state. Differential updates may contain a number of incremental updates needed to update a software product to the latest up-to-date state. In one embodiment, a server may create a differential update by aggregating incremental updates.

Figure 4A:
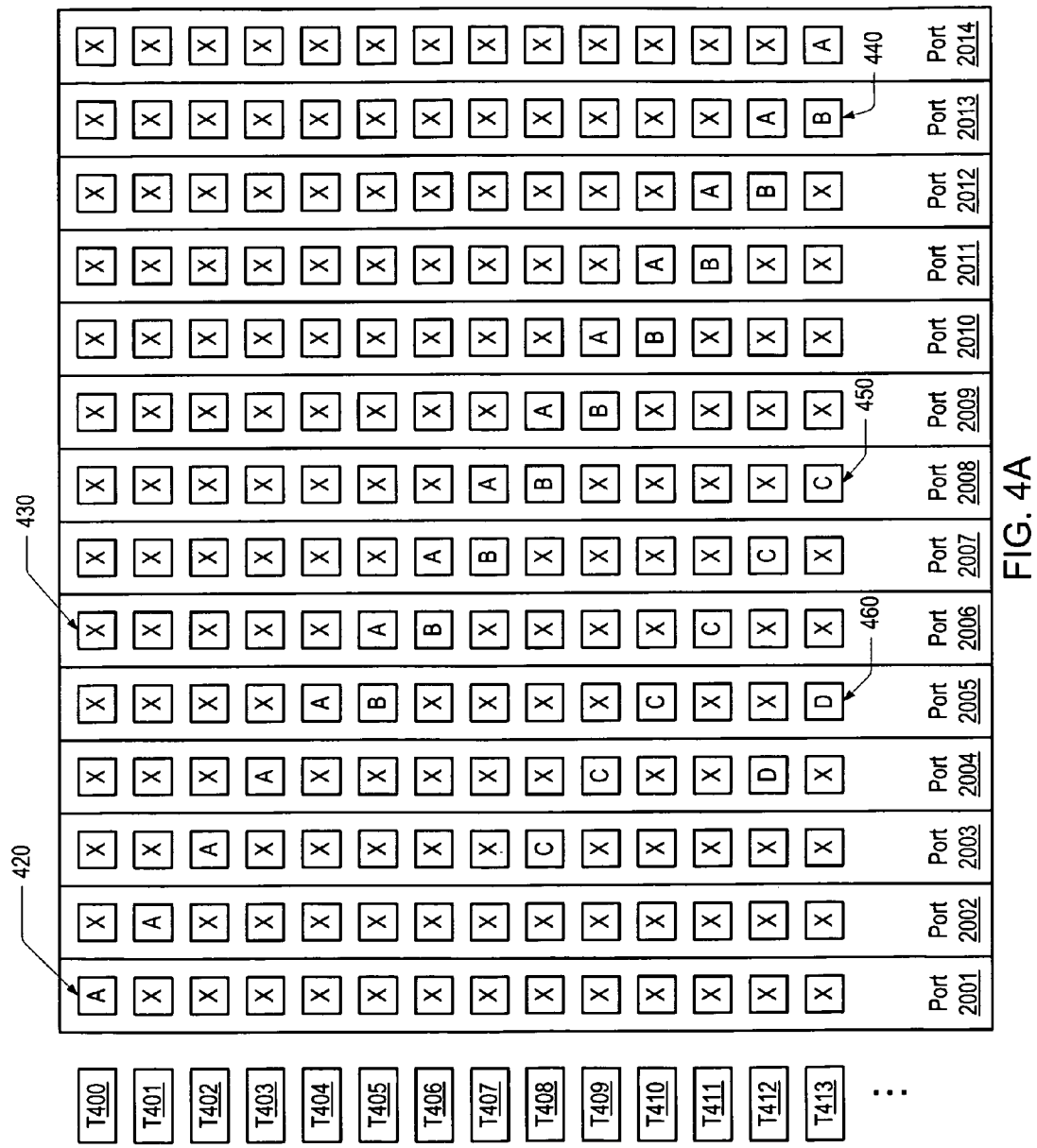
FIG. 4A illustrates one embodiment of a mapping between port numbers and updates that uses a time-based mapping algorithm.

FIG. 4A illustrates one embodiment of a mapping between port numbers and updates that uses a time-based mapping algorithm. Ports 2001-2014 are shown aligned on a horizontal axis with times T400-T413 on a vertical axis, starting at the top of the figure. Updates are indicated by a square containing a letter. For example, updates 420, 440, 450, and 460 are represented by squares containing the letters A, B, C, and D, respectively. For convenience, these updates may be referred to as updates A, B, C, and D. A square containing the letter X, such as square 430, indicates that there is no update available and hence no update is associated with the corresponding port.

An update may be associated with a port according to the following algorithm. In the example shown in FIG. 4A, updates A, B, C, and D, become available at times T400, T405, T408, and T412, respectively. It is noted that these times are chosen arbitrarily for purposes of illustration only. Initially, prior to time T400, there are no updates associated with any of ports 2001-2014. The mapping algorithm may first establish a base port number, for example, port number 2001. In alternative embodiments, some other port number may be chosen as the base port number. A base port number may be used to simplify calculations of port number for subsequent update-to-port associations. In addition, the base port number may be advertised to clients to be used by port selection algorithms.

At time T400, update A is the only available update and may be associated with a port whose number is the base port number, for example, port 2001. At time T401, the mapping algorithm may shift the association of update A from port 2001 to port 2002. In addition, in response to determining that update A is the latest available update, the mapping algorithm may remove the update association from port 2001, in effect creating a "gap" port. A query to a gap port may be handled by the server opening and quickly closing the connection, indicating that no update is available on the gap port. At time T402, the mapping algorithm may shift the association of update A to port 2003 and, in response to determining that update A is the latest available update, remove the update association from port 2002, causing both ports 2001 and 2002 to be gap ports. At times T403 and T404, the mapping algorithm may perform similar shifting of the update associations, causing the number of gap ports to increase by one at each time interval. Accordingly, at time T404, ports 2001 through 2004 may be gap ports.

At time T405, a new update may become available: update B. In response to detecting the availability of update B, the mapping algorithm may shift the associations of update A to port 2006, a timestamp corresponding to T405 may be associated with update B, and the mapping algorithm may associate update B with port 2005. A timestamp, as used herein, may be an attribute of a file such as a time and date that indicates when the file was created, modified, copied, first associated with a port, etc. Alternatively, a timestamp may be a separate metadata file that is associated with another file or group of files. For example, an XML metadata file may describe timestamps of a group of files that are components of an update package, such as a ZIP file. In one embodiment, each update maybe uniquely identified by its associated timestamp. In one embodiment, a differential update may include a series of incremental updates, each having a different timestamp. In such cases, the differential update may be associated with the timestamp of the latest included incremental update. At a subsequent point in time, the interval between the first update timestamp and the present time may be calculated and scaled by a proportionality factor. At each subsequent time interval, such as times T406-T413, the mapping algorithm may shift the pattern of update-to-port associations to the right by one. As may be appreciated, if times T400-T413 are regularly spaced time increments, there is a mathematical relationship between time and the port number with which each update may be associated. For example, each time a new update becomes available, it may be associated with a port whose port number is one less than the sum of the base port number plus the scaled difference between the current time and the timestamp of the latest previous update, rounded down to an integer. More particularly, in the illustrated embodiment, update C becomes available at time T408 and update D becomes available at time T412. Therefore, the port number with which to associate update D, 'N' may be calculated as follows.

For a base port number=2001, update C timestamp=T408, current time=T412, and a proportionality factor of 1 port per minute: N=(2001+(T412−T408)/1)−1=2004.

It is noted that if an update is available on a given port and an open connection exists to the given port, queries over the open connection may be served with the corresponding update as long as the connection is open. When a shift causes the given port to become a gap port or become associated with a different update, the shift may only affect new connections; existing connections may still be served according to the update association that existed at the moment a connection was established.

While a server is configured to use the time-based mapping algorithm illustrated in FIG. 4A, clients may be configured to use a corresponding time-based algorithm to select server ports on which to connect. As noted above, if times T400-T413 are regularly spaced time increments, there is a mathematical relationship between time and port number. A client-side port selection algorithm may also take advantage of this relationship. For example, assume that the server shifts port numbers at regular intervals of Y seconds. Further assume that a client-side port selection algorithm is aware of the base port number. When the client receives a first update, an associated first download timestamp may be provided by the server and recorded by the client. To account for differences between the clocks maintained by the client and the server, the client may make an adjustment to the timestamp. The client may receive an indication of server time from the server via a previous communication via an XML message, HTTP header, or some other suitable method to be used to make timestamp adjustments. In various embodiments, the amount of clock divergence may be small compared to the interval Y. For example, in one embodiment, clock divergence is expected to be less than 1 second between updates from the server and Y is expected to be approximately 1 minute. The resulting, adjusted timestamp may be subtracted from the current time, scaled by a predetermined proportionality factor, rounded down to the nearest integer, decreased by one, and added to or subtracted from the base port number, resulting in a target port number. If the target port number is greater than or equal to the base port number, the client may then query the server for updates using the target port number. If the target port number is less than the base port number, the client has the latest update and no query is necessary. In one embodiment, the target port number may be calculated using the difference between an absolute time and a timestamp. In an alternative embodiment, the target port number may be calculated using other time measurements that are relative to the start of a predetermined time period, such as an hour, a day, a week, etc.

To further illustrate the port selection algorithm, assume that Y=1 minute, the timestamp of an update is the time when it is first published on the server, and that the present time is T413. If the client already has the update A, then the timestamp associated with the update A could be T400. Therefore, the client may query on port 2013 and receive a response including update B. However, if the client already has the update B, the associated timestamp could be T405. Hence, the client may query on port 2008 and receive the next update, update C. Similarly, if the client already has update C, the client may query on port 2005 and receive the next update, update D. If the client already has the update D, the client may query on port 2001 and receive a response indicating that no new updates are available.

FIG. 4B illustrates an alternative embodiment of a mapping between port numbers and updates that uses another time-based mapping algorithm. FIG. 4B generally illustrates the mapping of updates to ports in the same manner as FIG. 4A. An update may be associated with a port according to the following alternative algorithm. In the example shown in FIG. 4B, as in FIG. 4A, updates A, B, C, and D, become available at times T400, T405, T408, and T412, respectively. It is noted that these times are chosen arbitrarily for purposes of illustration only. Initially, prior to time T400, there are no updates associated with any of ports 2001-2014. The mapping algorithm may first establish a base port number, for example, port number 2001. In alternative embodiments, some other port number may be chosen as the base port number. A base port number may be used to simplify calculations of port number for subsequent update-to-port associations. In addition, the base port number may be advertised to clients to be used by port selection algorithms.

At time T400, update A is available and may be associated with a port whose number is the base port number, for example, port 2001 and with all ports whose numbers are in a range starting at the base port number and extending to a number next before a number of a port that is associated with an older update. At time T401, the mapping algorithm may shift the associations of update A from ports 2001, and 2002, etc., to ports 2002 and 2003, etc. In addition, in response to determining that update A is the latest available update, the mapping algorithm may remove the update association from port 2001, in effect creating a "gap" port. A query to a gap port may be handled by the server opening and quickly closing the connection, indicating that no update is available on the gap port. At time T402, the mapping algorithm may shift the associations of update A to ports 2003 and 2004, etc. and, in response to determining that update A is the latest available update, remove the update association from port 2002, causing both ports 2001 and 2002 to be gap ports. At times T403 and T404, the mapping algorithm may perform similar shifting of the update associations, causing the number of gap ports to increase by one at each time interval. Accordingly, at time T404, ports 2001 through 2004 may be gap ports.

At time T405, a new update may become available: update B. In response to detecting the availability of update B, the mapping algorithm may associate update B with ports 2001 through 2005, leaving no gap ports. In addition, the mapping algorithm may shift the associations of update A to ports 2006 and 2007, etc. At each subsequent time interval, such as times T406-T413, the mapping algorithm may shift the pattern of update-to-port associations to the right by one, making port 2001 a gap port if no new updates are available and associating port 2001 and any existing gap ports with the latest update if a new update is available. It is noted that if an update is available on a given port and an open connection exists to the given port, queries over the open connection may be served with the corresponding update as long as the connection is open. When a shift causes the given port to become a gap port or become associated with a different update, the shift may only affect new connections; existing connections may still be served according to the update association that existed at the moment a connection was established.

While a server is configured to use the time-based mapping algorithm illustrated in FIG. 4B, clients may be configured to use a corresponding time-based port selection algorithm. For example, assume that the server shifts port numbers at regular intervals of Y seconds. Further assume that a client-side port selection algorithm is aware of the base port number. When the client receives a first update, an associated first download timestamp may be created on the client. This timestamp may be based on the time when the connection to the update server was established. To account for differences between the clocks maintained by the client and the server, the client may make an adjustment to the timestamp. The client may receive an indication of server time from the server via a previous communication via an XML message, HTTP header, or some other suitable method to be used to make timestamp adjustments. In various embodiments, the amount of clock divergence may be small compared to the interval Y. For example, in one embodiment, clock divergence is expected to be less than 1 second between updates from the server and Y is expected to be approximately 1 minute. The client and the server may know that the shift of ports happens at the beginning of each interval Y. In addition to making time difference adjustments, the client may adjust the timestamp to the beginning of its including interval Y. The resulting, adjusted timestamp may be subtracted from the current time, scaled by a predetermined proportionality factor, rounded down to the nearest integer, decreased by one, and added to or subtracted from the base port number, resulting in a target port number. If the target port number is greater than or equal to the base port number, the client may then query the server for updates using the target port number. If the target port number is less than the base port number, the client has the latest update and no query is necessary. In one embodiment, the target port number may be calculated using the difference between an absolute time and a timestamp. In an alternative embodiment, the target port number may be calculated using other time measurements that are relative to the start of a predetermined time period, such as an hour, a day, a week, etc.

To further illustrate the port selection algorithm, assume that Y=1 minute, the timestamps are the times adjusted to the beginning of each including interval Y when the client established connection to the server, and that the present time is T413. If it has been from 9 to 13 full minutes since the timestamp of the last received update, then the only update that was available is update A and the client may query the server on one of ports 2009-2013 and receive the next update, update B. However, if it has been from 6 to 8 full minutes since the timestamp of the last received update, the client received update B and may query on one of ports 2006-2008 and receive the next update, update C. Similarly, if it has been from 2 to 5 full minutes since the timestamp of the last received update, the client received update C and may query on one of ports 2002-2005 and receive the next update, update D. If it has been 1 full minute or less since the timestamp of the last received update, the client received update D and may query on port 2001 and receive a response indicating that no new updates are available.

Since a typical maximum available port number is 65535, for any given value of Y, there is a time limit for the use of the algorithm described above. For example, for a base port number of 2001 and Y=1 minute, all available ports will be exhausted after 63,534 minutes. In addition, it may be desirable to reserve some port numbers in the range above the well-known ports for other connection purposes. Therefore, an alternative mechanism may be added to the time-based mapping algorithm so that only a pre-determined number of ports are used. For example, in one embodiment, after a pre-determined period of time, older updates may be assigned to be available through an out-of-range port. The out-of-range port may be a port dedicated to serving updates or a well-known port such as HTTP port 80. The alternative mechanism may be implemented through the update service or through another server such as a web server, FTP server, file server, or any other suitable system. In response to calculating a port number that corresponds to a time interval exceeding the pre-determined period of time, a client-side port selection algorithm may be configured to perform a query for updates using one of the above alternative mechanisms, instead of using the calculated port number.

In an alternative embodiment, the time intervals used by the time-based mapping algorithm and corresponding time-based port selection algorithm may not be constant. For example, in one embodiment, after a predetermined period of time, the time interval may be increased, such as from 1-minute intervals to one-hour intervals. In further embodiments, after a second predetermined period, the time interval may be further extended, such as to 1-day intervals, etc. Any of a variety of combinations of time intervals may be used to efficiently utilize the available port numbers, so long as both the server-side port mapping algorithm and the client-side port selection algorithm are matched.

Figure 5:
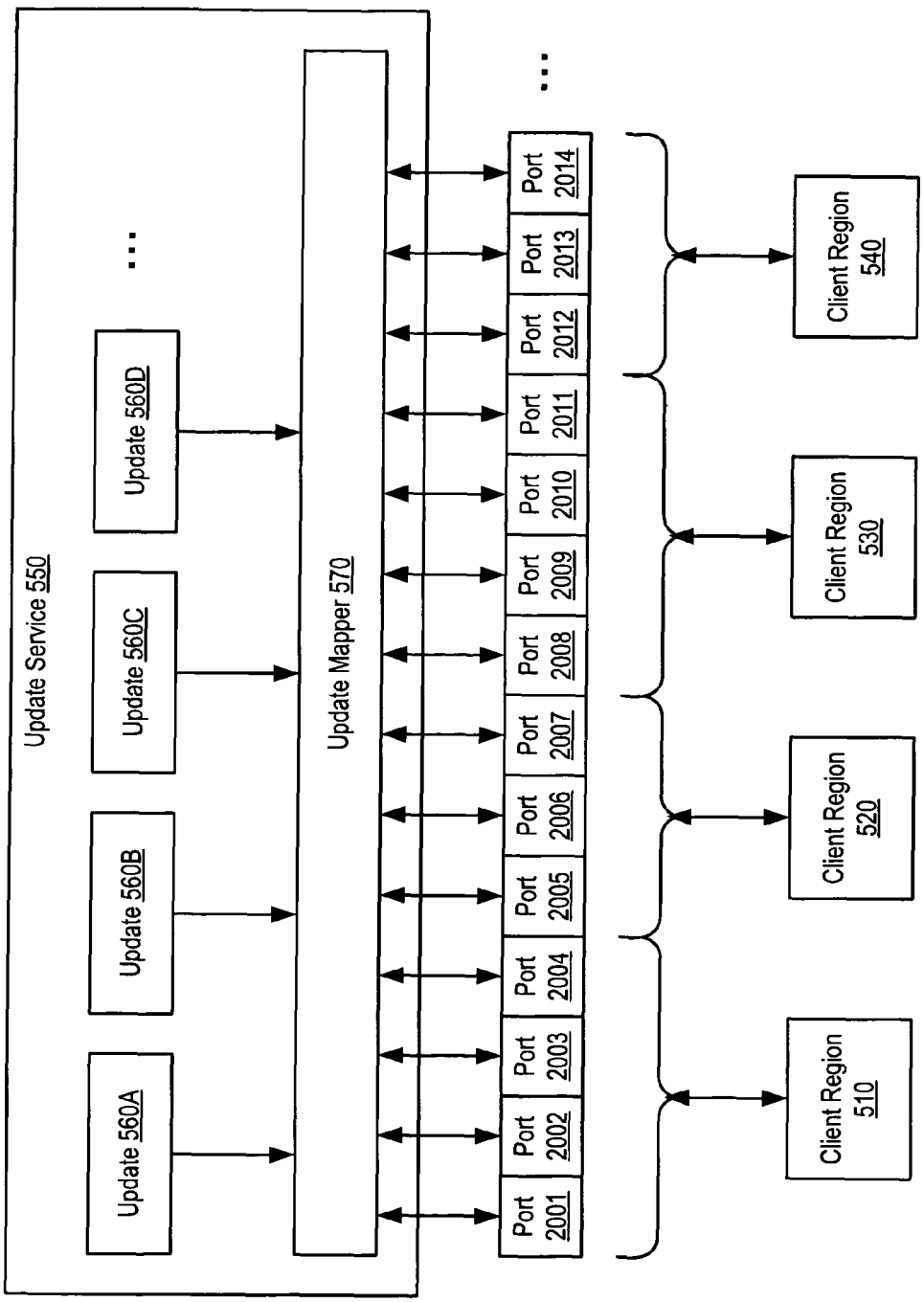
FIG. 5 illustrates one embodiment of a mapping between port numbers and updates that uses a geography-based algorithm.

FIG. 5 is a generalized block diagram of one embodiment of port-based communication between clients divided into geographic regions and an update service 550. In the illustrated embodiment, clients may be grouped into client regions 510, 520, 530, and 540 and configured to connect to a set of update service 550 coupled ports 2001-2014, etc. Update service 550 includes a sequence of updates 560A-560D, etc. coupled through an update mapper 570, which is coupled to ports 2001-2014. For example, clients located in region 510 may connect to update service 550 coupled ports 2001-2004, clients located in region 520 may connect to update service 550 coupled ports 2005-2007, clients located in region 530 may connect to update service 550 coupled ports 2008-2011, and clients located in region 540 may connect to update service 550 coupled ports 2012-2014. Each port may be associated with an update by a server mapping algorithm within an update mapper 570.

During operation, to determine whether or not a software update is available, a client may query the update server on a port that is associated with the client's corresponding region. Update mapper 570 may receive a query from a client, determine in which region the client is located, and map an update to the client via the port on which the query is received. For example, in one embodiment, the client region may be assigned and stored on a client during an initial communication with the server, such as during product activation, when each client communicates with the server via a port that does not belong to any region. During the communications, each client's region may be determined based on the client's IP address. After clients have been assigned to regions, update mapper 570 may receive a client query and distinguish among clients and their corresponding regions according to the port number on which the query was received. Since geographical region may be determined by port number, routers may easily snoop on packets to read a port number and direct packets to a server selected based on proximity to the client. In one embodiment, the server may provide geography-specific updates on each port. Alternatively, multiple time-based arrays may be maintained within update service 550, with each time-based array assigned to a different geographical area (e.g. client region 510 to ports 2001-2004, client region 520 to ports 2005-2007, etc).

Figure 6:
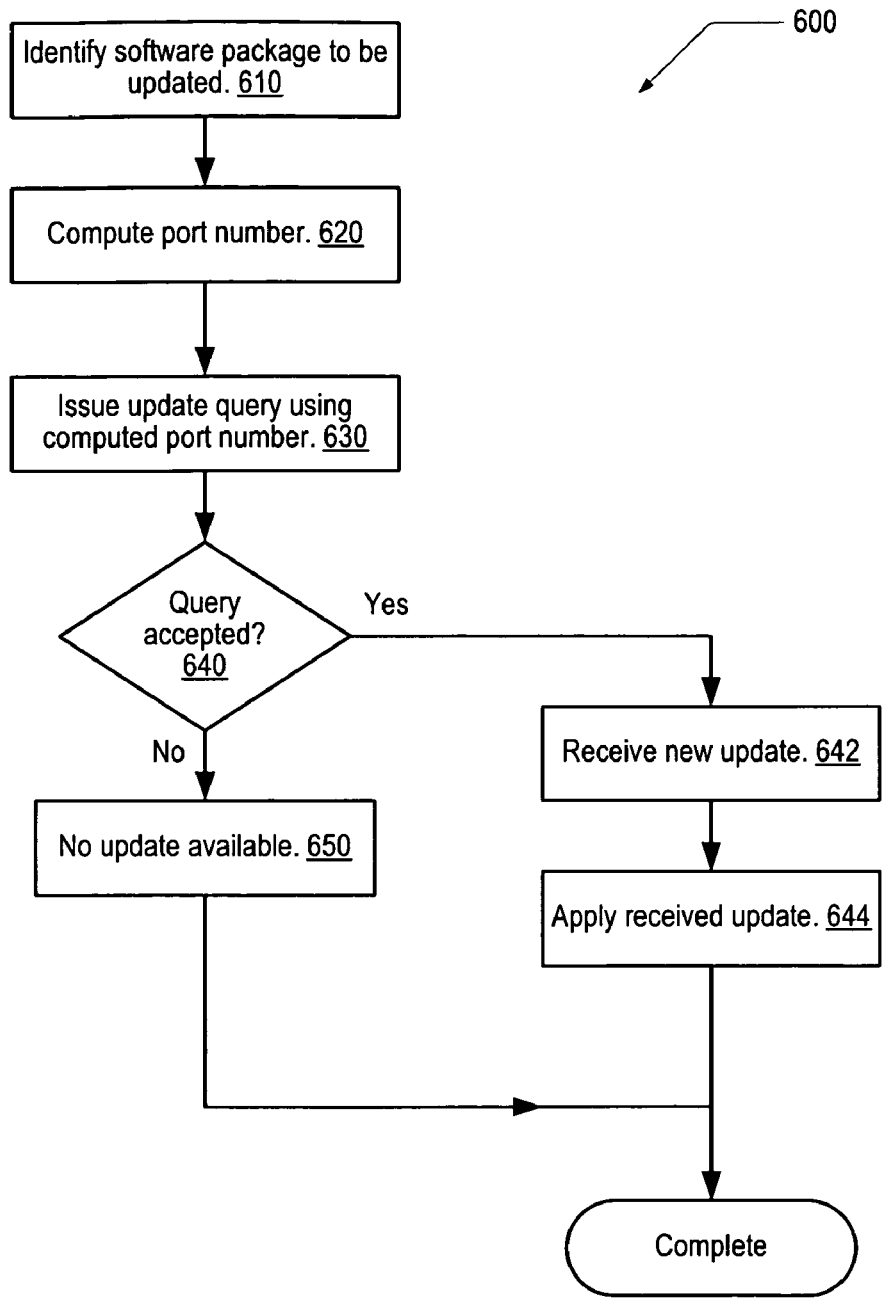
FIG. 6 illustrates one embodiment of a client software update process.

FIG. 6 illustrates one embodiment of a client software update process 600. Process 600 may begin with identification of a software package to be updated (block 610). Once a software package has been identified, process 600 may continue by computing a port number (block 620) on which to query an update server to determine if an update is available for the identified software package (block 630). A query may then be conveyed to the server. In response to detecting the query is not accepted (decision block 640), the client may determine that no update is available for the identified software package (block 650), completing process 600. If the query is accepted, the client may receive a new update in response (block 642). In response to receiving a new update, the client may apply the update (block 644), completing process 600.

Figure 7:
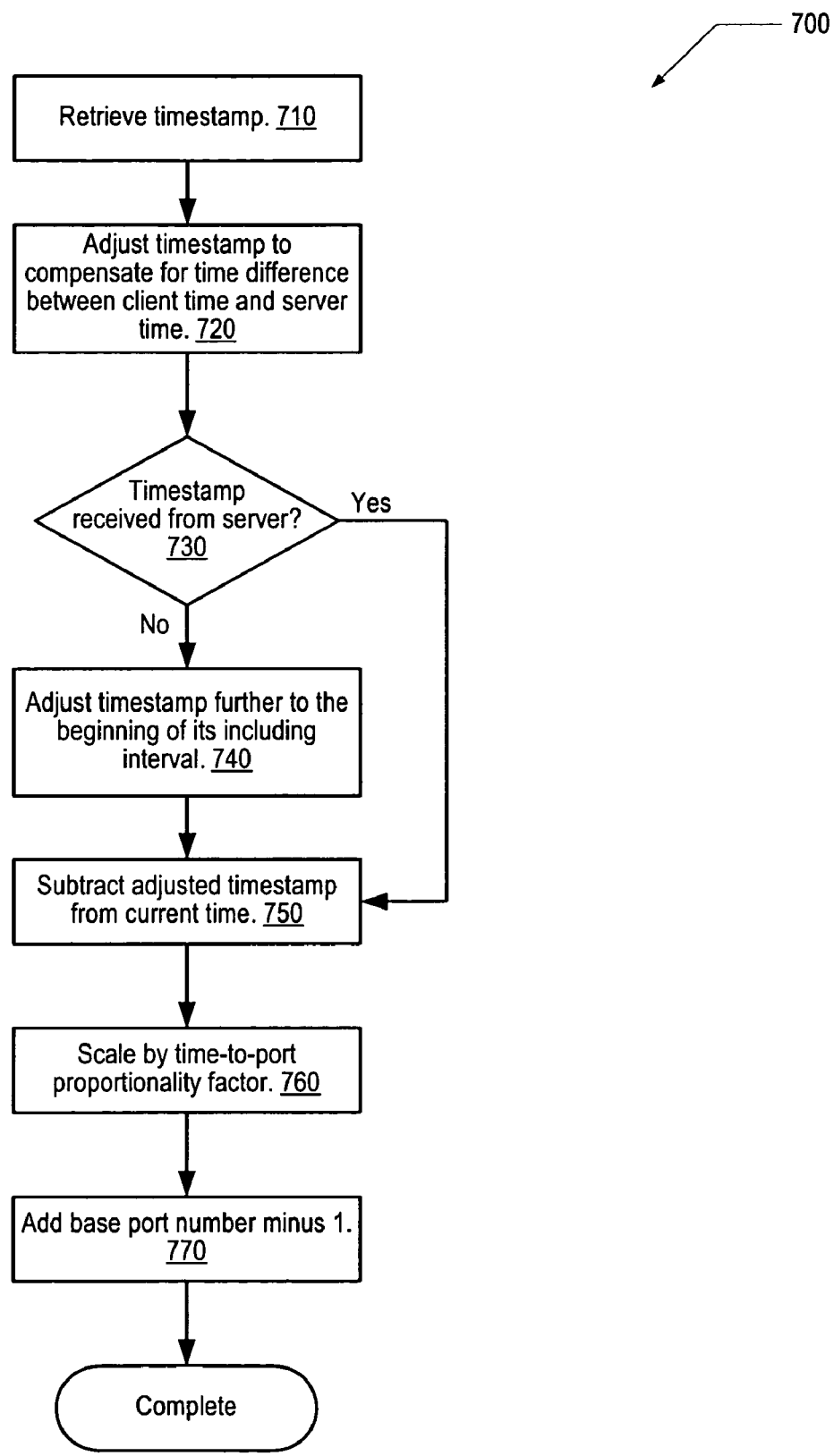
FIG. 7 illustrates one embodiment of a process that may be used by a client to determine a port number on which to issue a software update query.

FIG. 7 illustrates one embodiment of a process 700 that may be used by a client to determine a port number on which to issue a software update query. Process 700 may begin with retrieval of a timestamp that is associated with the most recent update of a particular software package on the client (block 710) and adjustment for differences between server time and client time (block 720). If the timestamp was received from a server (decision block 730), the adjusted timestamp may be subtracted from the value of the current time (block 750). The result of the subtraction may then be scaled by a predetermined proportionality factor (block 760), rounded down to the nearest integer, decreased by one, and the result added to a base port number (block 770), completing process 700. If the timestamp was not received from a server (decision block 730), the adjusted timestamp value may be further adjusted to the beginning of its including interval (block 740) and subtracted from the value of the current time (block 750). The result of the subtraction may then be scaled by a predetermined proportionality factor (block 760), rounded down to the nearest integer, decreased by one, and the result added to a base port number (block 770), completing process 700. Accordingly, in one embodiment, the port number may be equal to a base port number plus a port number offset where the value of the port number offset is 1 less than a number that is proportional to the time that has elapsed since the timestamp associated with the most recent update. For example, in a particular embodiment, the base port number may be 2001 and the port number offset may be one tenth of the number of minutes since the timestamp of the most recent update minus 1. If the client determines a port number offset that is negative, the client may conclude that it has the most recent update and no query is needed. If the client determines a port number that is greater than a maximum port number, an alternative method may be used to acquire an update.

Figure 8:
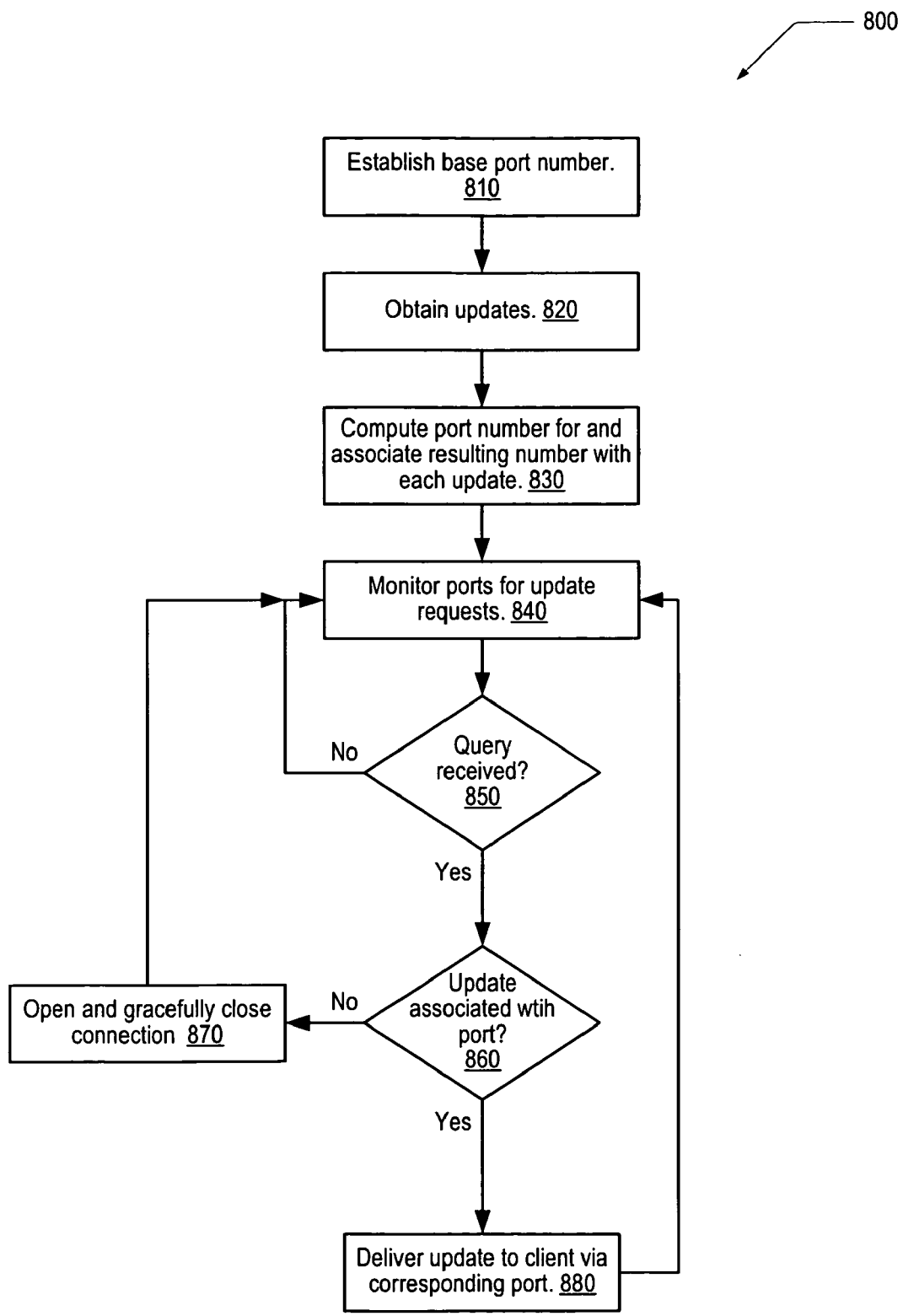
FIG. 8 illustrates one embodiment of a process that may be used to serve updates via multiple port numbers.

FIG. 8 illustrates one embodiment of a process 800 that may be used to serve updates via multiple port numbers. Process 800 may begin the establishment of a base port number (block 810). Process 800 may then continue with obtaining one or more updates for a given software package (block 820). For each update, one or more port numbers may be computed and associated with the update (block 830). In one embodiment, port numbers that are associated with the updates may fall within a range starting from the base port number and extending to a maximum port number. The range of port numbers in use may be monitored for update queries (block 840). If no queries are received, monitoring may continue indefinitely or until a system reset occurs (decision block 850). If a query is received (decision block 850) and no updates are associated with the port via which the query was received (decision block 860), a connection may be opened on the associated port and then gracefully closed (block 870). For example, in response to determining that an update is not associated with the first port, the server may complete processing of the update query below the application layer without passing the query up the stack to the application layer. Monitoring may then continue at block 840. If a query is received (decision block 850) and an update is associated with the port via which the query was received (decision block 860), a connection may be opened between the querying client and the server, an update may be delivered to the querying client via the port on which the query was received (block 880), the connection may be closed, and monitoring may continue at block 840.

Figure 9:
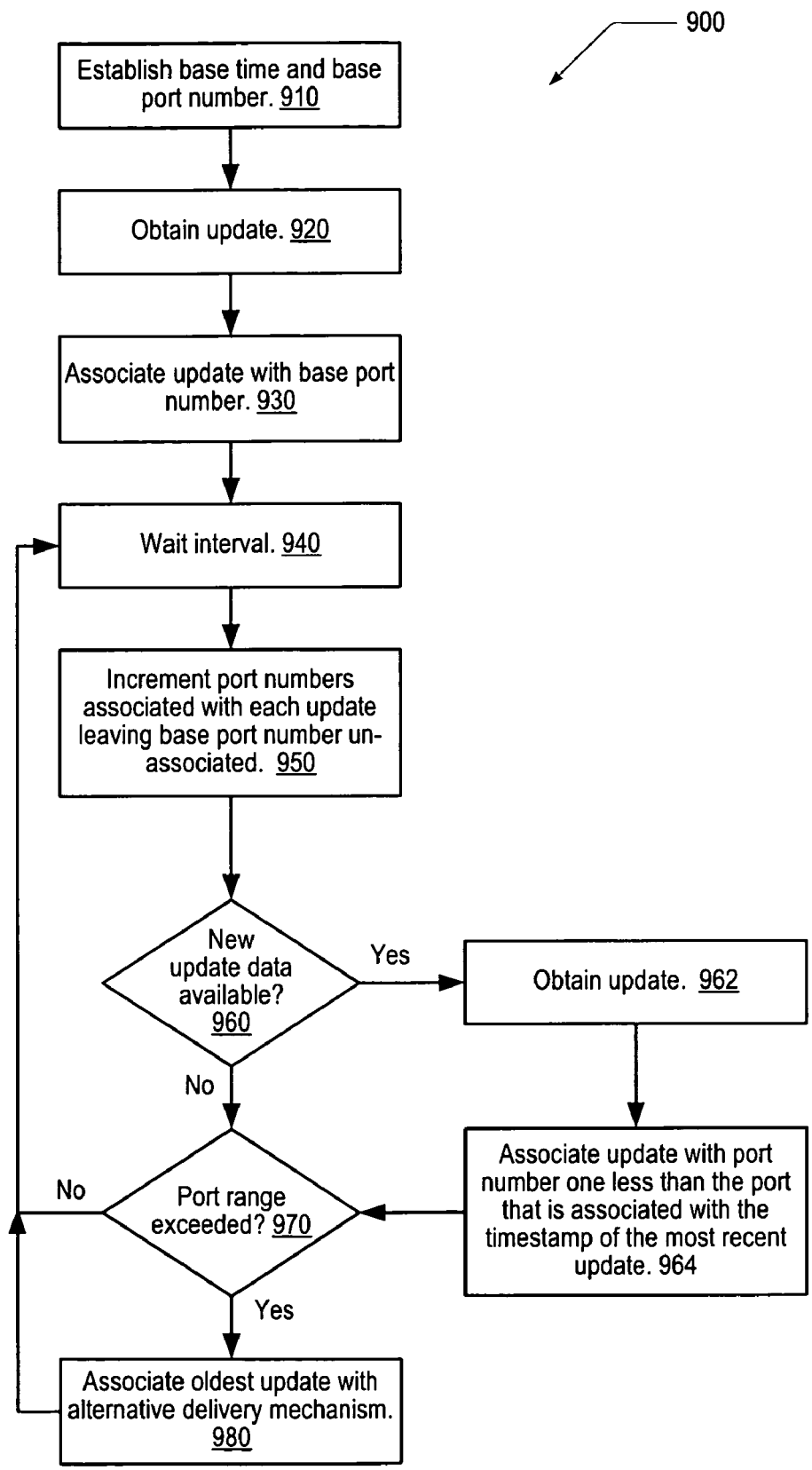
FIG. 9 illustrates one embodiment of a process that may be used by an update server to associate updates with ports based on time.

FIG. 9 illustrates one embodiment of a process 900 that may be used by an update server to associate updates with ports based on time. Process 900 may begin with the establishment of a base time and the association of a base port number with the next interval after the established base time (block 910). Process 900 may then continue with obtaining an update for a given software package (block 920). The newly obtained update may be associated with the base port number (block 930). After waiting for a pre-determined interval of time (block 940), the port number-to-update associations may be shifted by one, leaving the base port number un-associated (block 950). In one embodiment, the shifting of the port number associations has the effect of incrementing the port number with which a given update is associated. If a new update data is available (decision block 960), a new update may be obtained (block 962) and associated with a port whose number is one less than the lowest numbered port that is associated with a timestamp of another update (block 964). After associating the new update with one or more ports or if new update data is not available, the range of associated ports may be evaluated. If the range of associated ports has not exceeded a predetermined number (decision block 970), process 900 may continue at block 940. If the range of associated ports has exceeded a predetermined number (decision block 970), the oldest update may be associated with an alternative delivery mechanism (block 980) and process 900 may continue at block 940. For example, in one embodiment, an alternative delivery mechanism may be to deliver updates through an HTTP connection to the web server via well-known port 80.

Figure 10:
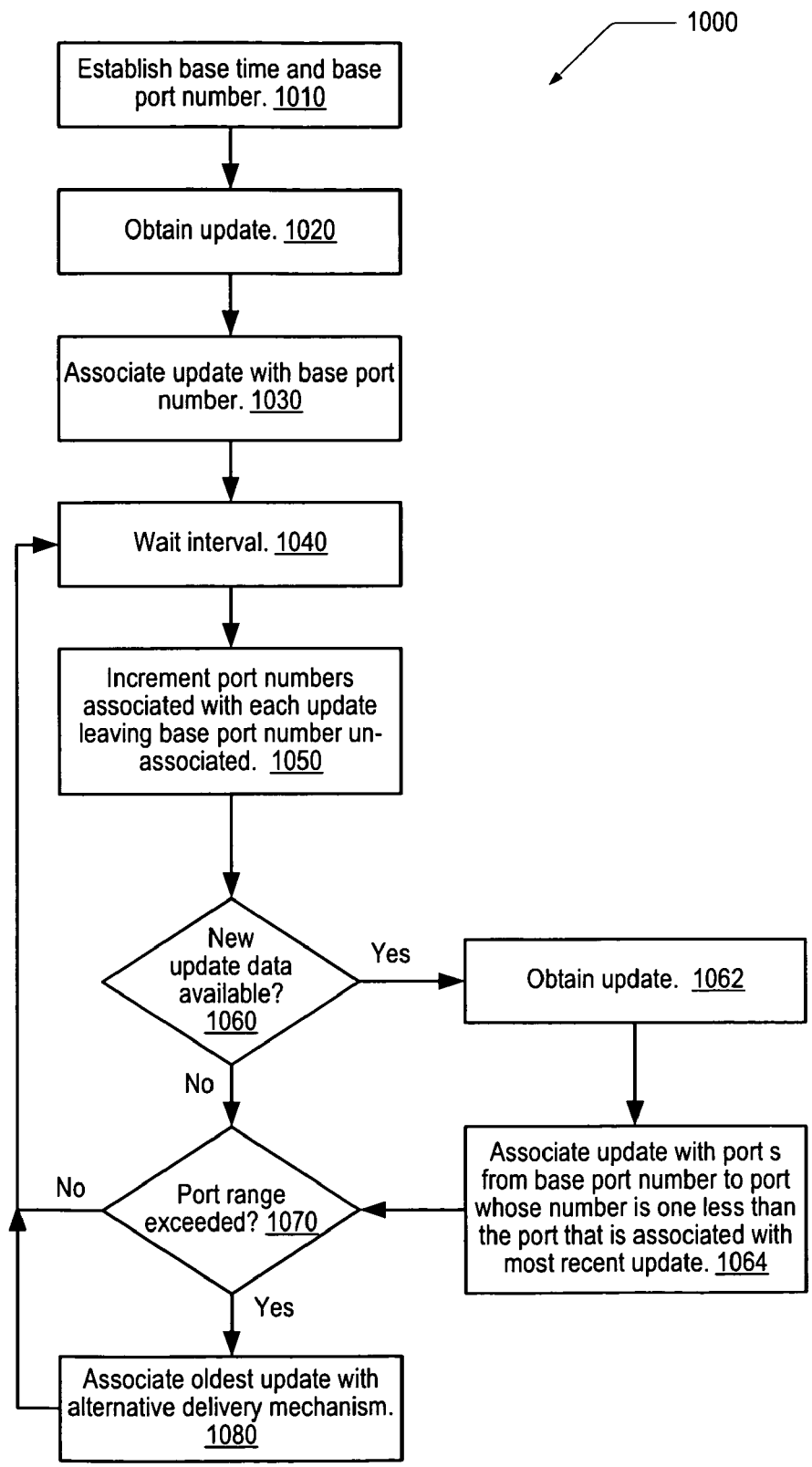
FIG. 10 illustrates one embodiment of an alternative process that may be used by an update server to associate updates with ports based on time.

FIG. 10 illustrates one embodiment of an alternative process 1000 that may be used by an update server to associate updates with ports based on time. Process 1000 may begin with the establishment of a base time and the association of a base port number with the next interval after the established base time (block 1010). Process 1000 may then continue with obtaining an update for a given software package (block 1020). The newly obtained update may be associated with all port numbers from the base port number up to a predetermined number (block 1030). After waiting for a pre-determined interval of time (block 1040), the port number-to-update associations may be shifted by one, leaving the base port number un-associated (block 1050). In one embodiment, the shifting of the port number associations has the effect of incrementing the port number with which a given update is associated. If a new update data is available (decision block 1060), a new update may be obtained (block 1062) and associated with all ports starting from the base port number and continuing up to but not including the lowest numbered port that is associated with another update (block 1064). After associating the new update with a port or if new update data is not available, the range of associated ports may be evaluated. If the range of associated ports has not exceeded a predetermined number (decision block 1070), process 1000 may continue at block 1040. If the range of associated ports has exceeded a predetermined number (decision block 1070), the oldest update may be associated with an alternative delivery mechanism (block 1080) and process 1000 may continue at block 1040. For example, in one embodiment, an alternative delivery mechanism may be to deliver updates through an HTTP connection to the web server via well-known port 80.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is noted that the above-described embodiments may comprise software. In such an embodiment, the program instructions that implement the methods and/or mechanisms may be conveyed or stored on a computer readable medium which may comprises one or more media. Numerous types of non-transitory computer readable storage media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of acquiring a software product update, the method comprising:
    associating one or more updates of a software product with one or more of a plurality of ports of a server, wherein said plurality of ports are sequentially numbered and said associating further comprises:
        determining a base port number;
        associating a new update with a port whose number is one less than the number of the lowest numbered port that is associated with a timestamp of another update, in response to detecting that the new update is available; and
        shifting associations of each update to a next port number at predetermined intervals;
    receiving an update query from a client via a first port of the plurality of ports;
    opening a connection to the client via the first port, in response to receiving the update query;
    conveying a response to the client including an update that is associated with the first port, in response to determining that an update is associated with the first port; and
    closing the connection without conveying an update, in response to determining that an update is not associated with the first port.

2. The method as recited in claim 1, wherein the method further comprises:
    processing the update query below an application layer of the server's communication protocol stack; and
    in response to determining that an update is not associated with the first port, completing processing of the update query below said application layer.

3. The method as recited in claim 1, further comprising the client:
    receiving a reply including a latest software product update from the server via the first port if a more recent update than a most recently received update in the client is available; and
    determining that a more recent update than a most recently received update in the client is not available, in response to detecting that a connection to the server via the first port has been opened and closed without a reply.

4. The method as recited in claim 1, wherein a given update is associated with one or more ports of the plurality of ports based at least in part on a timestamp associated with the given update.

5. The method as recited in claim 4, wherein shifting associations of each update to a next port number at predetermined intervals comprises:
    removing any update associations from a port whose number is one less than the number of the lowest numbered port that is associated with a timestamp of another update, in response to determining that a new update is not available; and
    associating the new update with a port whose number is one less than the number of the lowest numbered port that is associated with a timestamp of another update, in response to detecting that a new update is available.

6. The method as recited in claim 1, wherein the client is configured to calculate a port number of the first port based at least in part on a time difference between a current time and a timestamp associated with an update on the client.

7. A computer system comprising:
    a communication network; and
    a server coupled to the communication network, wherein the server is configured to:
        associate one or more updates of a software product with one or more of a plurality of ports of a server, wherein said plurality of ports are sequentially numbered and the server is further configured to:
        determine a base port number;
        associate a new update with a port whose number is one less than the number of the lowest numbered port that is associated with a timestamp of another update, in response to detecting that the new update is available; and
        shift associations of each update to a next port number at predetermined intervals;
    receive an update query from a client via a first port of the plurality of ports;
    open a connection to the client via the first port, in response to receiving the update query;
    convey a response to the client including an update that is associated with the first port, in response to determining that an update is associated with the first port; and
    close the connection without conveying an update, in response to determining that an update is not associated with the first port.

8. The system as recited in claim 7, wherein the update query is processed by the server below an application layer of the server's communication protocol stack and wherein in response to determining that an update is not associated with the first port, the server is configured to complete processing of the update query below said application layer.

9. The system as recited in claim 7, further comprising a client coupled to the server via the communication network, wherein the update query is received by the server from the client, and wherein the client is configured to:

receive a reply including a latest software product update from the server via the first port if a more recent update than a most recently received update in the client is available; and determine that a more recent update than a most recently received update in the client is not available, in response to detecting that a connection to the server via the first port has been opened and closed without a reply.

10. The system as recited in claim 7, wherein a given update is associated with one or more ports of the plurality of ports based at least in part on a timestamp associated with the given update.

11. The system as recited in claim 10, wherein the server is further configured to:

remove any update associations from a port whose number is one less than the number of the lowest numbered port that is associated with a timestamp of another update, in response to determining that a new update is not available; and associate the new update with a port whose number is one less than the number of the lowest numbered port that is associated with a timestamp of another update, in response to detecting that a new update is available.

12. The system as recited in claim 7, wherein the client is configured to calculate a port number of the first port based at least in part on a time difference between a current time and a timestamp associated with an update on the client.

13. A non-transitory computer readable storage medium storing computer instructions that are executable by a processor on a server to:

associate one or more updates of a software product with one or more of a plurality of ports of a server, wherein parts are sequentially numbered and the instructions are further executable to:

determine a base port number;

associate a new update with a port whose number is one less than the number of the lowest numbered port that is associated with a timestamp of another update, in response to detecting that the new update is available; and shift associations of each update to a next port number at predetermined intervals;

receive an update query from a client via a first port of the plurality of ports;

open a connection to the client via the first port, in response to receiving the update query;

convey a response to the client including an update that is associated with the first port, in response to determining that an update is associated with the first port; and close the connection without conveying an update, in response to determining that an update is not associated with the first port.

14. The non-transitory computer readable storage medium as recited in claim 13, wherein the client is configured to:

receive a reply including a latest software product update from the server via the first port if a more recent update than a most recently received update in the client is available; and determine that a more recent update than a most recently received update in the client is not available, in response to detecting that a connection to the server via the first port has been opened and closed without a reply.

15. The non-transitory computer readable storage medium as recited in claim 13, wherein the program instructions are further executable to cause the client to calculate a port number of the first port based at least in part a time difference between a current time and a timestamp associated with an update on the client.

16. The non-transitory computer readable storage medium as recited in claim 13, wherein the instructions are further executable to associate a given update with one or more ports of the plurality of ports based at least in part on a timestamp associated with the given update.

17. The non-transitory computer readable storage medium as recited in claim 16, wherein the instructions are further executable to:

remove any update associations from a port whose number is one less than the number of the lowest numbered port that is associated with a timestamp of another update, in response to determining that a new update is not available; and associate the new update with a port whose number is one less than the number of the lowest numbered port that is associated with a timestamp of another update, in response to detecting that a new update is available.

* * * * *